US012464075B1

(12) United States Patent
Chinnaraju et al.

(10) Patent No.: US 12,464,075 B1
(45) Date of Patent: Nov. 4, 2025

(54) TRANSITIONAL HANDOFF FROM A DIGITAL COMMUNICATION DEVICE TO A DESIGNATED INTERACTION ROUTING SYSTEM

(71) Applicant: Wells Fargo Bank, N.A., San Francisco, CA (US)

(72) Inventors: Venkatesan Chinnaraju, Fremont, CA (US); Brad E. Ingles, Saint Paul, MN (US); Casey William Landvatter, Amherst, NH (US); Chris L. Lieu, San Francisco, CA (US); Jassen Andrew McNulty, Richmond, CA (US); Mikhail Shimberg, Walnut Creek, CA (US); Ling Yee Lindy Sin, San Francisco, CA (US); Richard Glen Smith, Des Moines, IA (US); Nishit Kumar Thakur, Fremont, CA (US); Srinivasa Gupta Vudathv, Chandler, AZ (US)

(73) Assignee: Wells Fargo Bank, N.A., San Francisco, CA (US)

( * ) Notice: Subject to any disclaimer, the term of this patent is extended or adjusted under 35 U.S.C. 154(b) by 405 days.

(21) Appl. No.: 18/060,241

(22) Filed: Nov. 30, 2022

Related U.S. Application Data

(60) Provisional application No. 63/381,172, filed on Oct. 27, 2022.

(51) Int. Cl.
*H04M 3/527* (2006.01)
*H04M 3/51* (2006.01)
*H04W 12/06* (2021.01)

(52) U.S. Cl.
CPC ........ *H04M 3/527* (2013.01); *H04M 3/5183* (2013.01); *H04W 12/06* (2013.01)

(58) Field of Classification Search
CPC .... H04M 3/527; H04M 3/5183; H04W 12/06
See application file for complete search history.

(56) References Cited

U.S. PATENT DOCUMENTS

| 8,014,496 | B2 * | 9/2011 | Schultz | H04M 3/385 |
| | | | | 379/88.19 |
| 9,344,892 | B1 * | 5/2016 | Rodrigues | H04M 15/848 |
| 11,425,245 | B2 * | 8/2022 | Mahar | H04L 51/234 |
| 2001/0019604 | A1 | 9/2001 | Joyce et al. | |
| 2009/0144068 | A1 | 6/2009 | Altberg et al. | |

(Continued)

*Primary Examiner* — Brandon J Miller
(74) *Attorney, Agent, or Firm* — SCHWEGMAN LUNDBERG & WOESSNER, P.A.

(57) ABSTRACT

Disclosed in some examples are methods, systems, and devices which provide for an IRS menu bypass and an authentication and session transfer to a live agent according to some examples of the present disclosure. When a handover condition is detected the ANLPA requests a security token from the IRS. The ANLPA also provides the user's authentication status, context information about why the user is calling, and/or other information to the IRS. When the user calls, they provide the security token to the IRS. The IRS uses the token to look up the authentication status and the context information and to automatically route the user to the correct live agent. In some examples, in order to enhance security, the user remains authenticated only if they are calling from a same computing device that hosted the ANLPA session and requested the security token.

17 Claims, 6 Drawing Sheets

(56) References Cited

U.S. PATENT DOCUMENTS

| | | |
|---|---|---|
| 2010/0291912 A1 | 11/2010 | Tafarrodi et al. |
| 2011/0025842 A1 | 2/2011 | King et al. |
| 2015/0350446 A1 | 12/2015 | Glass et al. |
| 2016/0066365 A1 | 3/2016 | Najafabadi et al. |
| 2018/0374108 A1 | 12/2018 | Kannan et al. |
| 2020/0204542 A1* | 6/2020 | Nair .................... H04L 63/0884 |
| 2020/0250287 A1* | 8/2020 | Singh .................... H04L 9/3231 |

* cited by examiner

TRANSITIONAL HANDOFF FROM A DIGITAL COMMUNICATION DEVICE TO A DESIGNATED INTERACTION ROUTING SYSTEM

PRIORITY CLAIM

This patent application claims the benefit of priority, under 35 U.S.C. Section 119 to U.S. Provisional Patent Application Ser. No. 63/381,172, entitled "Transactional Handoff From a Digital Communication Device to a Designated Interaction Routing System," filed on Oct. 27, 2022, which is hereby incorporated by reference herein in its entirety.

TECHNICAL FIELD

Embodiments pertain to providing a continuing customer interaction handling process during a transitional handoff from a digital communication device to a designated interaction (e.g., voice) routing system. Some embodiments pertain to using an authentication status of a user of a digital application session on a subsequent interaction (e.g., voice call) made to a separate interaction processing system. Some embodiments pertain to using an authentication status of a user of a digital application session in a subsequent interaction with a separate interaction processing system only if the user is calling from a same computing device that hosted the digital application session.

BACKGROUND

Network-based services may utilize network-based service applications, which may execute on computing devices of the user (such as a smartphone) and, by communicating with the network-based service, provide functionality via user interfaces that allow users to service their accounts on the network-based service and to perform various related functions. In some examples, these network-based service applications may provide Graphical User Interfaces (GUIs) that allow users to service their accounts through various menus, widgets, text boxes, and other GUI elements. In other examples, the network-based service applications may use natural language interfaces such as an Automated Natural Language Personal Assistant (ANLPA) which respond to commands, queries, or other tasks specified by a user via a natural language input. The natural language input may be typed in by the user or may be spoken by the user. The natural language input is processed by Natural Language Programming (NLP) algorithms (such as machine-learning algorithm like neural networks) to determine the user's intent. The user's intent is then mapped to an action such as executing a query, processing a command, or completing a task. An output of the action is sent back to the user in a natural language format. In some examples, the ANLPA may obtain additional information to complete a task using natural language question and answer sequences.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
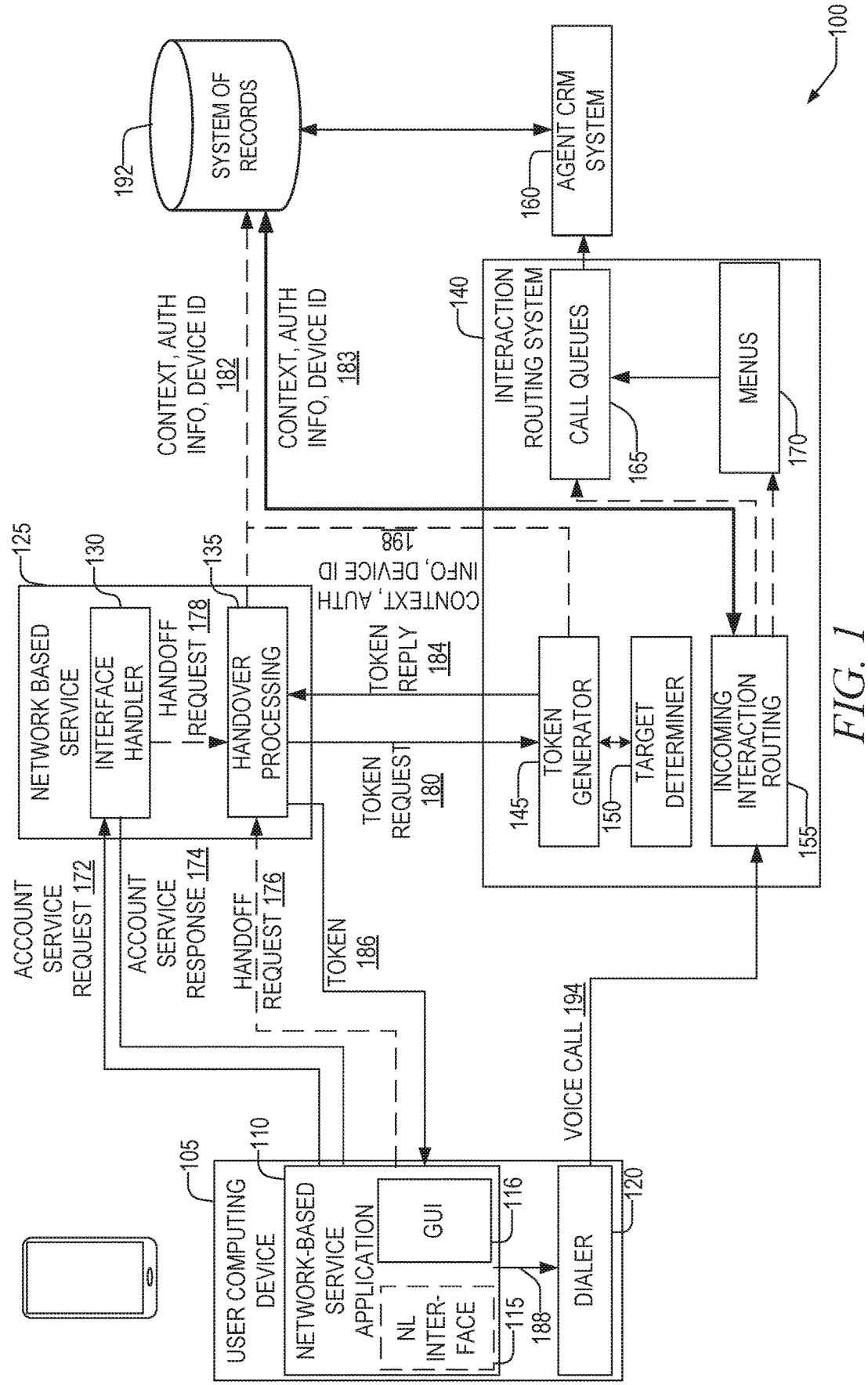
FIG. 1 illustrates a logical diagram of an interaction transfer system according to some examples of the present disclosure.

One issue with network-based service applications is that they may have a limited number of actions they are capable of performing. For example, the user of a network-based service application may have tasks that they wish to complete that the network-based service application cannot help them with. Furthermore, if the network-based service application utilizes an ANLPA interface, the ANLPA's algorithms may not understand, or have difficulty understanding the user's natural language input.

In these instances, the user may be directed to another interaction type, such as to call a live phone agent. These redirection actions are often directed to a separate computing system from the systems of the network-based service interacting with the network-based application. In some examples, this separate computing system may be called an interaction routing system (IRS). The IRS is a computing system which routes communications to a destination communication type and recipient. For example, the IRS may be a voice call system where communications such as phone calls are routed to a particular destination, such as a call queue of a live agent. In other examples, other types of communications may be routed to other destinations. Other examples including routing a call to a voicemail box, routing a chat to a live chat agent, routing to another ANLPA, or the like. In some examples, the IRS may provide menu tree where users are asked various questions and provide various replies using voice commands, Dual-Tone Multi-Frequency Signaling (DTMF), digital inputs, and the like. Depending on the given answers, additional questions may be asked. These interactions are designed to assess the needs of the user and to determine a target to route the interaction (e.g., a call) to the correct destination (e.g., a live agent).

The IRS may be a separate service from the network-based service or may be integrated with the network-based service. Regardless of the integration between the two services, the IRS and/or the communication destination (e.g., the live agent) authenticates the user. This may be despite the user having been previously authenticated with the network-based service application.

The user is thus authenticated twice, once to the network-based service application and once to the IRS. Additionally, despite having the context and history of the network-based service application, users may be forced to select multiple options to route the interaction when the network-based service application already knows the nature of the customer's problem. This causes frustration and inconvenience for users and is wasteful of resources by requiring additional power, processing resources, and network resources by authenticating the user multiple times. At the same time, simply transferring session information of the network-based service application and/or authentication status between these systems presents challenges. For example, how does the IRS know a particular interaction (e.g., call) is a same user that was authenticated with a network-based service application session? Even if an authentication token or some other form of identification is somehow passed to the IRS, it is still possible that the identification may be used by an imposter. These security issues are especially problematic for highly regulated industries such as banking and finance.

Disclosed in some examples are methods, systems, and devices which provide for a secure transfer of authentication status from a first system such as a network-based service to a second system such as an IRS according to some examples of the present disclosure. When a handover condition is detected, the network-based service requests, from the IRS, a security token. The network-based service may also provide to the IRS the user's authentication status on the network-based service application, context information about why the user is calling, and/or other information. The token may then be provided to the network-based service application executing on the user's computing device. The network-based service application then initiates an interaction with the IRS—for example, by interfacing with a dialer application to provide a phone number to the IRS and, upon initiation of the interaction, provides the security token to the IRS that was previously created by the IRS. The IRS uses the token to identify the authentication status of the user on the network-based service application to the network-based service, to lookup the previously provided context information from the network-based service application, and to determine a predefined target route of the user (e.g., the correct live agent).

In some examples, in order to enhance security, the user remains authenticated at the same level they were with the network-based service only if the interaction is initiated from the same computing device that hosted the network-based service application session that requested the security token. If a different computing device is used, for example in instances in which the user is disabled and is using a relay call service, the user may still be routed to the target destination (e.g., a correct live agent), and the context information may still be presented to the live agent, but the live agent may be instructed to re-authenticate the user. Matching an identifier of the computing device with the token prevents person-in-the-middle attacks whereby malicious users intercept the token. In additional example, the token is provided as a DTMF string after the phone number. It would be possible for a third-party to "shoulder surf" and intercept this token. By checking that the identifier of the computing device that is the caller is the same as the identifier of the computing device that requested the token and previously authenticated the user, these types of attacks are thwarted, and the user's account is secured. At the same time, by routing the user to the determined target, users having disabilities that prevent them from terminating the call with their own devices may have a similar experience to those using their own devices.

The above technical solution of providing authentication tokens and matching those tokens with an identifier of a computing device to maintain authentication, properly route a caller, and to transfer a context of the caller from a network-based service application session to the live agent solves the technical problems of wasted networking and processing resources used to re-authenticate a user while avoiding the aforementioned security problems of transferring said context and authentication. The present disclosure thus improves the functioning of the computing system by providing enhanced security, minimizing power consumption, and minimizing network resource usage. Finally, the present disclosure provides enhanced user interfaces that avoid frustrating menus and other information gathering stages.

FIG. 1 illustrates a logical diagram of an interaction transfer system 100 according to some examples of the present disclosure. User computing device 105 may execute one or more applications such as a network-based service application 110, a dialer application 120, and one or more other applications that are not shown for clarity. Network-based service application 110 may communicate with a network-based service 125 to provide or manage one or more products or services. For example, network-based service 125 may be a service provider such as a bank; a merchant; a social networking service; or the like. Network-based service application 110 may include one or more user interfaces such as a Graphical User Interface (GUI) 116. In addition, the network-based service application 110 may include a Natural Language (NL) interface 115. NL interface 115 may be an interface to an ANLPA which allows users to ask requests, query data sources, perform commands, and other actions. Responses to requests, queries, and commands may be provided in a natural language fashion. The ANLPA may be entirely provided by the NL interface 115 in that commands are translated from NL to intents and intents to actions and the actions are initiated and/or carried out by the user computing device 105. In other examples, the network-based service 125 may also perform one or more operations of the ANLPA.

Network-based service application 110 sends account service requests such as account service request 172 which request one or more actions. Account service request 172 may be in the form of a natural language request, in which case the network-based service 125 may interpret the intent of the natural language request and perform actions corresponding to that intent using NLP algorithms. In other examples, the account service request 172 may be in the form of a standardized Application Programming Interface (API) call—e.g., created by the network-based service application as a result of interactions and selections made using the GUI 116. In other examples, rather than sending the natural language request to the network-based service 125, the natural language request may be interpreted by the network-based service application 110 and converted to the standardized API call.

Interface handler component 130 may receive the account service request 172, take one or more actions, such as changing one or more parameters of the user's account, and provide an account service response 174. In some examples, the account service response 174 may be in a natural language format. Example actions may include checking account parameters (e.g., balance of the account), transferring money, and the like.

One or more of the NL interface 115, GUI 116, and the interface handler component 130 may provide a session of a network-based service application. The session may be authenticated to the network-based service through providing one or more credentials of a user. A session comprises an authentication operation followed by a sequence of one or more user inputs by the user and responses by the network-based service application. Sequences are defined, in some examples: by sets of inputs and/or responses that share a proximity in time—e.g., inputs and/or responses within a specified time window; the series of inputs and responses during a same execution of the network-based service application 110; sets of inputs and/or responses without long pauses in inputs and/or responses; sets of inputs and/or responses related to a particular topic or task; or the like.

During a network-based service application session, at some point, a need for a handover to a different form of communication, such as a live agent, may be detected. This may be detected by the NL interface 115, GUI 116, or the network-based service 125 and may be explicitly indicated by the user or may be implicitly detected. For example, the user may explicitly request a live agent through a UI element such as a menu selection, button press, or the like. That is, a user may be authenticated in the network-based service application and activate a "click to connect" GUI element or some other GUI element. In these examples, a handoff request 176 may be sent by the network-based service application 110 to handover processing component 135. In other examples, the interface handler component 130 may detect the handoff condition as a result of the account service request 172. For example, if the account service request 172 includes an NL input that indicates an intent for talking to a live agent, frustration, or an inability to understand the user. In these examples, a handoff request 178 may be sent by the interface handler component 130 to the handover processing component 135. In still other examples, actions taken by the user may indicate a handover condition. For example, perhaps the user intends to move resources from a first account to a second account, but the amount of resources in the first account does not cover the amount the user is trying to move. Thus, conditions on the account may indicate a handoff condition.

In response to a handoff request 176 or 178, handover processing component 135 sends a token request 180 to an IRS 140. The token request 180 may include the authentication state of the user in the network-based service application 110, an identification of the user computing device 105 (e.g., a phone number, IP address, Universal Unique ID, or other identifier of the user computer device 105), a context of the network-based service application session, and the like. In other examples, rather than directly message these details to the IRS, the handover processing component 135 may optionally send these details to a system of records 192 using messaging 182. In some examples, the context of the session may include one or more of: a product that the user needs help with, a query of the user, a reply of the system, a transcript of the session, an intent determined by the NLP algorithms (in the case that the input is an NIL input), or the like.

If the token request 180 includes one or more of the authentication state, context, and identification of the user computing device 105; this information may be stored by the token generator component 145 in the system of records 192 using messaging 198. The system of records 192 may be accessible to the network-based service 125 and the IRS 140. In some examples, other types of storage may be used, such a temporary cache. System of records 192 may be a standalone database or may be part of network-based service 125 or IRS 140.

In response to the token request 180, the token generator component 145 of the IRS 140 may generate a token. The token may be associated in the system of records 192 with the identification number of the user computing device 105. As noted previously, the tokens generated may have an expiry time to further preserve security. The expiry time may be recorded in the system of records 192. The token may comprise one or more digits, characters, or the like. The token may be generated as a random number. The token may not contain any authentication information or authentication tokens used to access the network-based service 125 but may be used as a database key to access the authentication state information in the system of records 192.

Additionally, the token generator component 145 may communicate with a target determiner component 150 which utilizes the context information to generate a destination routing target such as a call queue, another communication destination (e.g., chatroom, voice mailbox, email inbox, or the like). The routing target is then stored in association with the token—e.g., in the system of records 192. The token is then sent back to the handover processing component 135 with message 184. This is then passed back to the Network-based service application 110 using message 186.

Network-based service application 110 can then interact with the IRS 140 directly or through another application executing on the user computing device 105. For example, by interacting with another application on the user computing device 105, such as a dialer application 120 or some other application. Other applications may include text applications, other chat applications, and the like. For contacting the IRS 140 using a voice call—as is shown in FIG. 1, the network-based service application 110 may cause the dialer application 120 to display the phone number of the IRS 140 and to append the digits of the token after the phone number of the IRS 140 at operation 188. In some examples, the network-based service application 110 may use an Application Programming Interface to invoke the dialer application 120. In some examples, the number may include pauses between the number and the digits of the token to allow enough time for the IRS 140 to respond to the call and read the token. Dialer application 120 has functionality to make phone calls and pass communications to and from the user to and from the IRS 140 (and other phone reachable endpoints).

If the user calls the phone number, the dialer application 120 causes a call 194 to be made to the IRS 140. For other interactions to the IRS, the other interactions are initiated by the network-based service application 110, or another application. Once the call or other interaction is connected, the IRS 140 creates an interaction record that stores information about the interaction. The user computing device 105 then transmits the token to the IRS. For example, the dialer application 120 may send the token to the IRS 140, such as by using DTMF tones. The incoming interaction (e.g., call) is handled by an incoming interaction routing component 155 of IRS 140. The incoming interaction routing component 155 recognizes the presence of the token (e.g., digits sent by the user computing device 105), consults the system of records 192 using messaging 183, and checks to see if the token matches a stored token. Tokens may expire after a prespecified time period, so the incoming interaction routing component 155 may check to ensure the token has not expired. In some examples, the digits may be provided by the dialer application 120 by dialing the number of the IRS 140, pausing a specified amount of time (e.g., by using a ',' character to specify a delay) and then entering the digits corresponding to the token as DTMF tones.

If the token is still valid, the incoming interaction routing component 155 may record the authentication status information from the system of records 192 that is associated with the token in the interaction record. The authentication status information includes authentication information on the level of authentication of the user during the session of the network-based communication application. In some examples, the authentication information may be one or more key-value pairs. The incoming interaction routing component 155 may then determine whether the device identifier of the incoming call matches the device identifier associated with the token.

If the device identifier of the incoming call does not match the device identifier associated with the token, the incoming interaction routing component 155 may remove the authentication information from the interaction record. This strips the call of the authentication status of the session of the network-based application from which the token was created and indicates to the destination (e.g., a Customer Relationship Management (CRM) system 160) that the user needs to be authenticated. Note that the interaction is still routed to the routing target (e.g., a call queue)—and the user will be re-authenticated at the target (e.g., the live agent will authenticate the user). By routing the call or other interaction to the target based upon the token and regardless of the device identifier matching or not, this allows users with disabilities that require a relay call to experience the same dynamic routing while still preserving security safeguards. Identifiers of devices may include a telephone number, Internet Protocol (IP) address, Medium Access Control (MAC) address, Universal Unique Identifiers, or the like.

If the device identifier of the incoming call does match the device identifier associated with the token, the authentication status of the session of the network-based application from which the token was created is transferred with the interaction record to the interaction target of the IRS such as a live agent call. As shown in FIG. 1, the target may be a call queue of call queues component 165 (and ultimately agent CRM system 160 when the agent answers), menus provided by component 170, and the like. As previously described, other interaction targets may include voicemail boxes, chat rooms, and the like. In examples where the target is a live agent, the live agent, when answering the call, can see, on an agent application, and based upon the presence of the authentication information (and the associated authentication level if multiple authentication levels are used by the network-based service) can see that the user is authenticated.

In examples in which a user has a correct token but incorrect identification number, there may be several non-fraud reasons. For example, it could be fraud such as a bad actor looking over someone's shoulder in a public place and trying to impersonate the user. In other examples, it could be a family member or caregiver helping the user. Since, in some examples, the token is appended to the phone number of the IRS, someone helping the user may also type in the token. In other examples it could be the customer calling from a different one of their devices. Thus, by routing the interaction to the pre-specified interaction target, but removing the authentication information from the interaction record, the user's experience in these situations is still streamlined by potentially avoiding menus provided by menus component 170 (e.g., Interactive Voice Response—IVR menus). The user will be authenticated at the interaction target.

As noted, the interaction is routed by the incoming interaction routing component 155 to the specified target if the token is provided. If the token is not provided, the interaction may be routed to a default route if a token is not provided—such as menus provided by menus component 170.

Agent CRI system 160 is used by a live agent to answer a call from the call queue assigned to that agent from the group of call queues component 165. The CRM system 160 may display one or more of the authentication status, context information, and the like of the user. In some examples, the CRM system 160 may display whether the user is already authenticated (e.g., through the IVR menus 170, the token authentication process where both the token and the device identifier match, or the like); or whether the agent is to authenticate the user. Menus component 170 may provide one or more audio, visual, or other menus to obtain information about the user prior to routing to a target interaction. In some examples, the target may be determined using information gathered by the menus component 170.

Agent CRI system 160 may provide one or more displays and functionality for a live agent to communicate with a customer. Included in the displays may be what type of authentication and what level of authentication is required of the user. For example, if the user provided a token, but the device identifier of the calling device does not match the device identifier of the user computing device (e.g., user computing device 105) that requested the token, the user may have a disability and may be using a relay call. In some examples, the mere act of providing the token indicates that a lower level of authentication may be required rather than a more stringent authentication without the token. For example, authentication may be specified in various levels, with a highest level requiring the most sensitive information from the user (e.g., a password and two factor authentication code) and the lowest level requiring the least amount (e.g., personal information of the user such as age, hometown, or the like). The act of providing the token may lower the authentication level required—thus lowering the sensitivity of the information required to authenticate.

Thus, in examples in which a user: is authenticated to the network-based service through the network-based service application, provides the token to the IRS, and is initiating the interaction with the IRS from the same device that the user used for the network-based service session: the user is both taken immediately to the routing destination (e.g., a call queue without going through the IVR menu) and is authenticated. Thus, the user does not have to provide credentials, passwords, or answers to questions to establish their authentication. For a user that is authenticated to the network-based service through the network-based service application, provides the token to the IRS, and is not initiating the interaction with the IRS from the same device that the user used for the network-based service session: the user is still taken immediately to the routing destination (e.g., a call queue without going through menus) and is not authenticated. Thus, the user may have a better experience overall (e.g., not having to navigate menus for example) but will still have to authenticate to ensure the security of their account.

Interactions with IRS 140 may include voice interactions, digital interactions, or the like. Example voice interactions may include phone calls; example digital interactions may include text messaging, chat messages, or the like. In some examples, the IRS 140 manages interaction types not handled by servers processing information for the network-based application.

Figure 2:
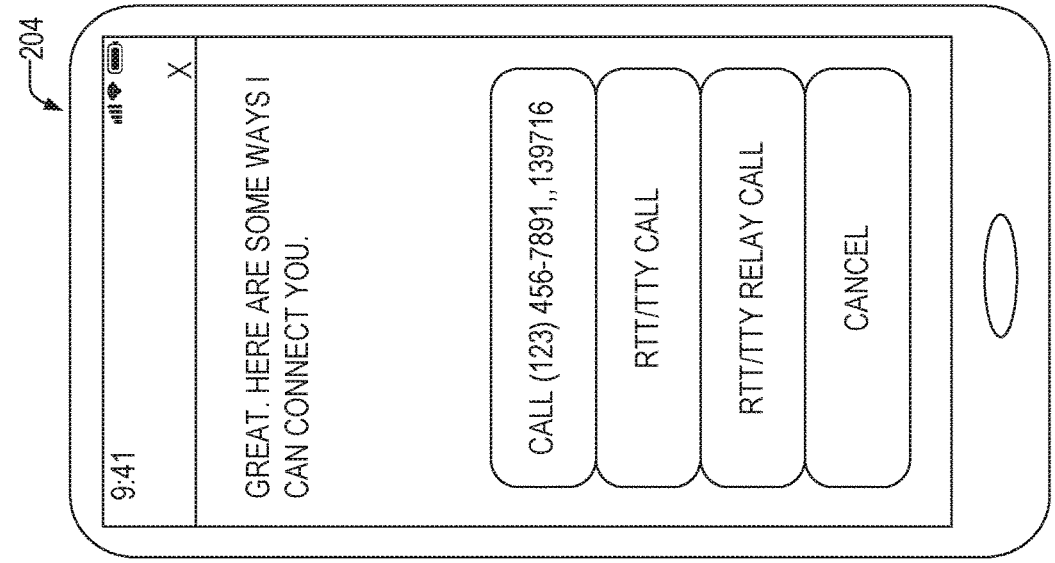
FIG. 2 illustrates a series of example GUI screens that show the process of obtaining live assistance according to some examples of the present disclosure.
Figure 2:
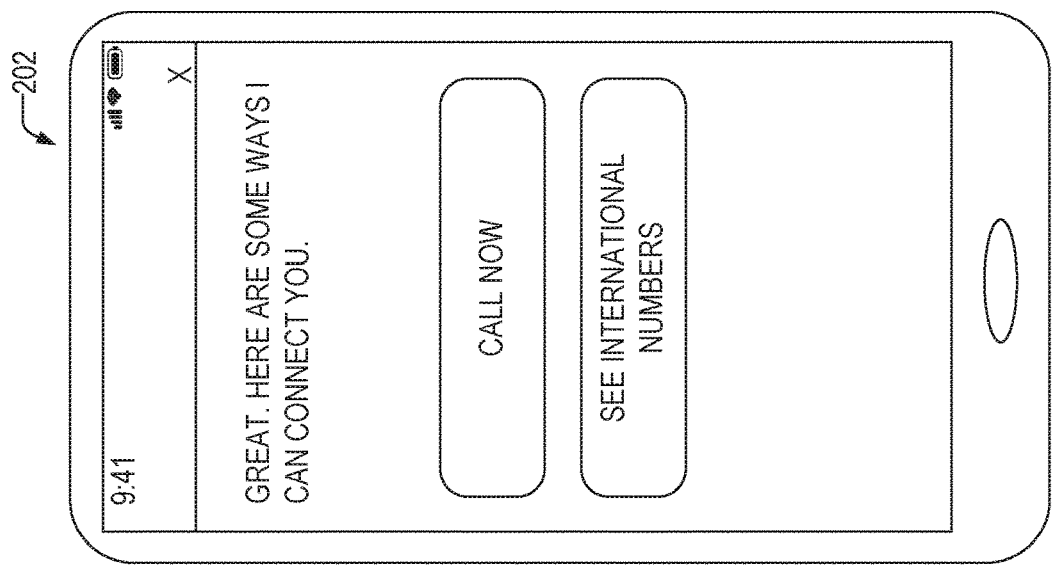
Figure 2:
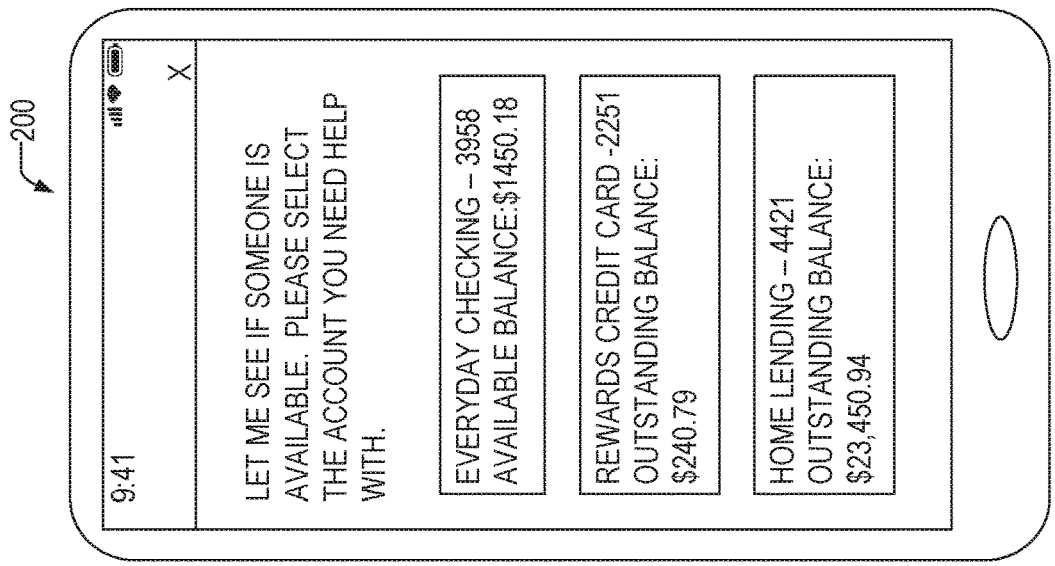

FIG. 2 illustrates a series of example GUI screens 200, 202, and 204 that show the process of obtaining live assistance according to some examples of the present disclosure. GUI 200 is a first screen right after detection of the handover condition. The prompt, in some examples, may prompt for additional context information, such as the account the user wishes to speak with the live agent about. Thus, explicit user input may be a source of the context information provided to the IRS. After the user enters the account information, the system displays GUI screen 202 which allows users to place a call by activating a call now control or if they need international numbers (e.g., they are traveling abroad), they can select that option to see the list of international numbers.

GUI screen 204 is activated when the user selects the call now button of GUI screen 202. The GUI screen 204 shows the number to call '(123)456-7891' with the token digits '139716' appended after pause digits ','.

Figure 3:
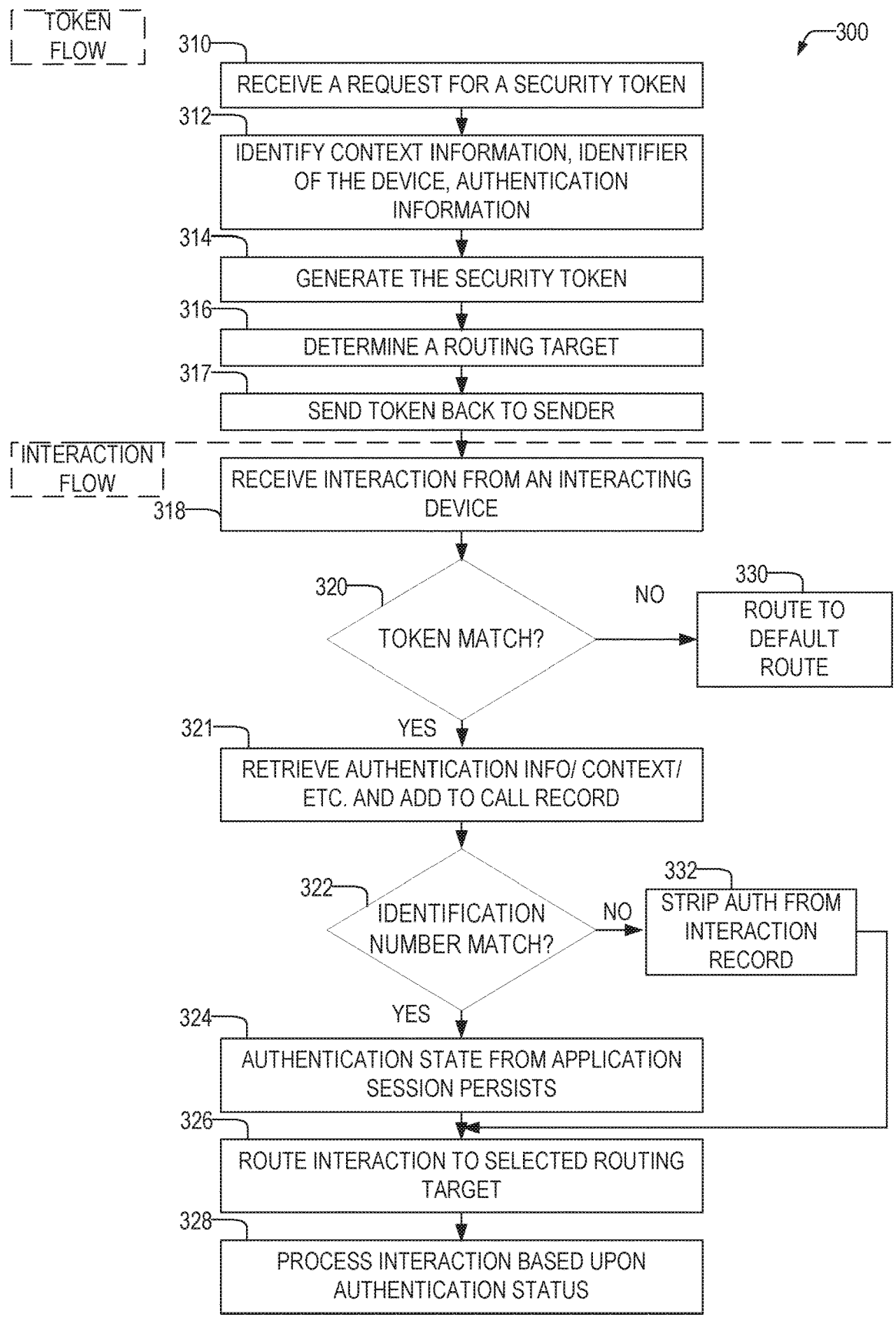
FIG. 3 illustrates a flowchart of a method of an Interaction Routing System (IRS) for creating tokens and handling interactions placed with tokens according to some examples of the present disclosure.

FIG. 3 illustrates a flowchart of a method 300 of an IRS (such as IRS 140) for creating tokens and handling interactions according to some examples of the present disclosure. The method 300 is divided into two flows, a token flow, comprising operations 310-317, and an interaction flow comprising operations 318-332. The token flow relates to detection of the handover condition and creation of the token and the interaction flow relates to receipt of the call at the IRS and authenticating the token and device identifier.

At operation 310, the IRS receives a request for a security token. For example, over a network from a network-based service, such as network-based service 125. In other examples, the network-based application (such as network-based service application 110) may communicate directly with the IRS to request the token. The request may be received over a packet-based network.

At operation 312, the IRS may identify context information of a session of the network-based application (such as network-based service application 110), an identifier of the device, and the authentication information of the session. The context may be identified with reference to a system of records (such as system of records 192) or may be present in the request received at operation 310.

As previously noted, the transfer of the user to a specific target (e.g., a specific call queue bypassing the IRS menus), providing of context information to a live agent, and the transfer of authentication status may occur in conjunction with a NL interface such as an ANLPA. In other examples, this may occur from a different, non-NL interface of a network-based service application on a computing device, such as a traditional GUI interface with buttons and other GUI controls.

At operation 314, a security token may be generated (e.g., by a token generator component 145 of an IRS 140). The security token may be a random string of digits of a prespecified length. In some examples, the digits may be unique with respect to the IRS or other system in that the same digit sequence is not assigned to another user while the token is valid. Other generation methods may be used, such as an OAuth token generation.

At operation 316, the IRS may determine a routing target of the requested interaction. For example, a destination group of agents from a plurality of groups of agents, e.g., based upon the context information. Other example routing targets may include a call queue, someone's voicemail, the IVR menus, a chatroom, a chat session, another virtual agent, or the like. While the disclosure herein has, at times, described the transfer in terms of transferring to a voice channel, the disclosed techniques may also transfer the user to other interaction types. In some examples, the IRS may have a mapping table that lists agent groups or departments and context information that causes the call to be routed to particular groups or departments based upon the value of the context information. In some examples, if-then style rules that depend upon one or more values of one or more items of context information may be used. For example, 'if (context value A=1, but context value B!=2) then route the call to target A.' The routing decision may be stored in the IRS or the system of records and may be associated with the token. In some other examples, the routing decision, context information, and/or authentication information may be encoded in the token—e.g., converted to digits of the token.

Once the token is generated and the routing decision determined, the token may be provided to the requester at operation 317. Once the token is provided to the requestor, the token flow ends, and flow resumes at operation 318 upon receiving an interaction from a user during the interaction flow.

At operation 318 an interaction is received from an interacting device. At operation 320, a determination is made as to whether there is a token presented by the interacting device and whether that token matches a valid token. If not, then at operation 330, the user is routed to a default route such as placing the call into a menu tree.

If a valid token is present, then at operation 321 the authentication status information and the context information is pulled from the system of records and copied into the interaction record. A determination is made at operation 322 as to whether the device identifier of the device requesting the token is the same as the device providing the token. If not, then the authentication status information is stripped from the interaction record at operation 332 and flow proceeds to route the interaction to the selected routing target at operation 326. If the numbers match, then the interaction inherits the authentication state of the network-based application session at operation 324.

At operation 326, the interaction may be placed into the appropriate target determined at operation 316, such as a call queue of the group of agents determined for the token (e.g., the group of agents determined at operation 316 for the token created at operation 314). This may be a department that handles the product identified in GUI 200 of FIG. 2, or the like.

At operation 328, the system processes the interaction based upon the authentication status. For example, for a live agent, when the live agent answers, or before, the IRS may provide one or more call information GUIs that may provide the authentication status, prompts for additional authentication if needed, and the context information to assist the live agent in answering the customer's call. In some examples, once the interaction is over, the token may be removed to prevent unauthorized future use. In some examples, the token may also expire or time out.

Figure 4:
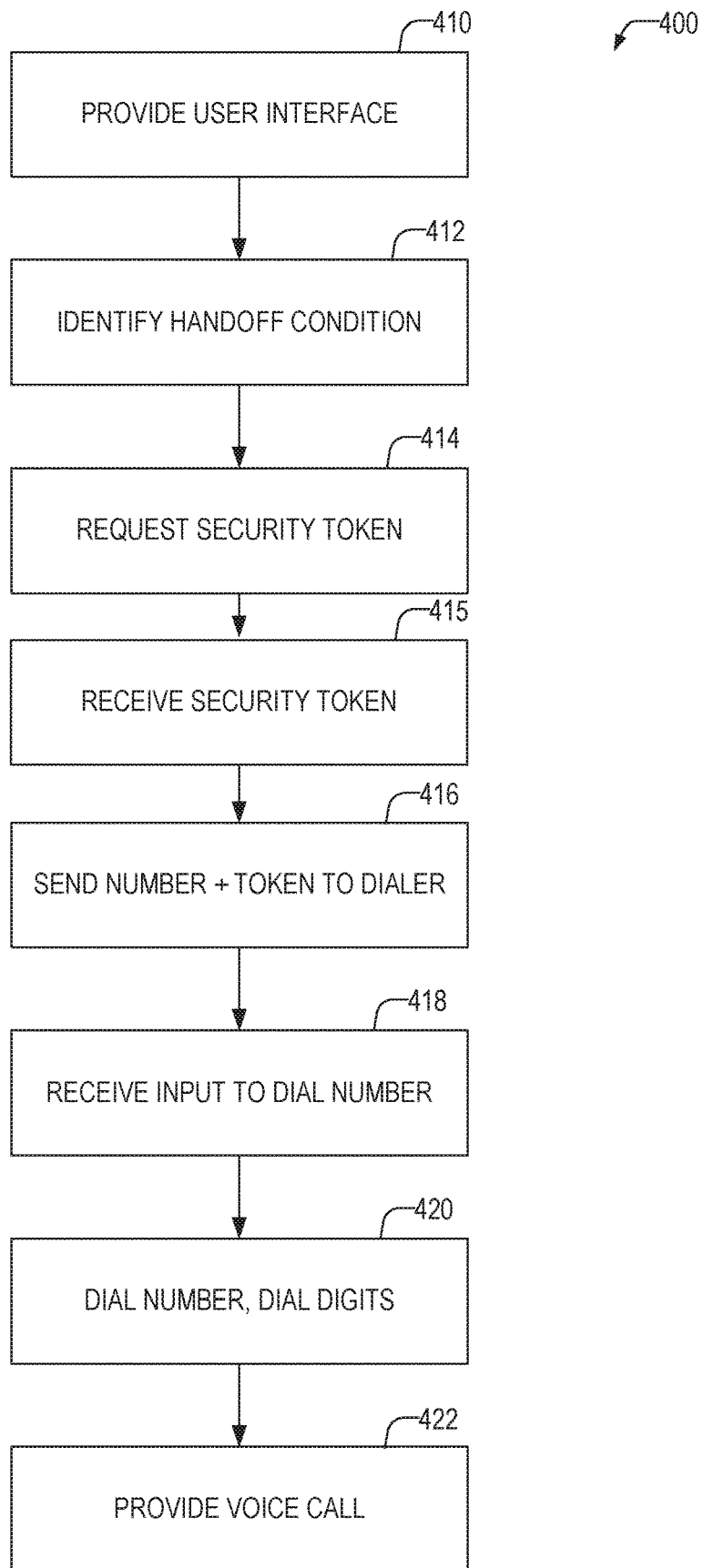
FIG. 4 illustrates a flowchart of a method of a network-based service application providing a handover to a live agent according to some examples of the present disclosure.

FIG. 4 illustrates a flowchart of a method 400 of a network-based service application (such as network-based service application 110) providing a handover to a live agent according to some examples of the present disclosure. In FIG. 4, the user is transferred to a live operator, but in other examples, different interactions may be used. At operation 410 the application may provide a user interface such as a GUI or a Natural Language (NL) interface. The NL interface may be an interface to, or be, an ANLPA that receives input in a natural language format, determines an intent of the input, translates the intent into an action or task, completes the task, and then provides output to the user in a natural language format.

At some point during the session, the application may identify a handoff condition at operation 412. This may be a failure to translate the user's natural language into an intent, a failure to translate the intent into an action or task, a failure to complete the action or task, or a failure to be able to provide an output in a natural language format. In other examples, the handover condition may be an explicit request from the user. At operation 414, in response to the handoff condition detection, the application may request a security token. The request may be directly made to the IRS or may be made to a virtual assistant service or a network-based service. In some examples, the application may first obtain additional context information, such as which product this request relates to, and the like. The handoff request may include context information such as a transcript of the ANLPA session, a determined intent, a reason for the handoff, a product, as well as an authentication state, and the like. The security token may be received at operation 415.

Once the security token is received, then the device may contact the IRS using one or more interactions and provide the token. For example, a voice call as shown in FIG. 4. In these examples, at operation 416, the number of the IRS service along with the token is sent to the dialer. For example, by appending digits corresponding to the token at the end of the number and calling a function of the dialer using interprocess communication and an Application Programming Interface (API) of the dialer. The dialer may then prompt the user as to whether they wish to dial the number. If the user indicates that they wish to dial the number at operation 418, then at operation 420, the dialer dials the number with the digits and inputs the token. At operation 422 the dialer provides the voice call with the IRS service.

Figure 5:
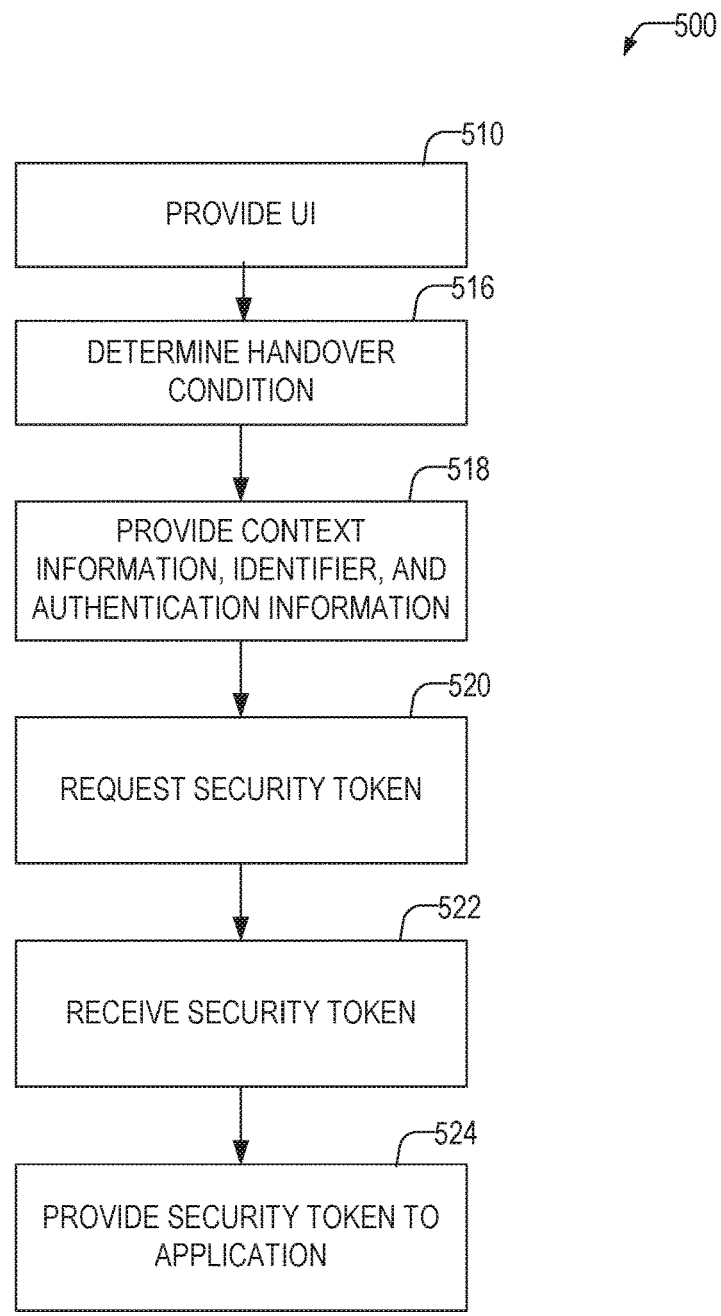
FIG. 5 illustrates a flowchart of a method of providing a virtual assistant service with handover according to some examples of the present disclosure.

FIG. 5 illustrates a flowchart of a method 500 of providing a network-based application with handover according to some examples of the present disclosure. At operation 510 the network-based service provides a UI. For example, by exchanging messages using an API with a network-based application and providing one or more account services. In other examples, by providing natural language processing algorithms for processing NL input. The NL input may be a typed input, a spoken input, or the like. The input may be received from an application on a computing device of the user, such as a network-based service application 110 of the user computing device 105. The NL input may be converted to an intent. For example, using one or more machine learning algorithms such as neural networks. The intent may be mapped to a particular action and the action may be performed.

Actions performed may include account related functions such as financial account related functions such as providing balances, transferring money, reporting fraud on an account, applying for credit, finding an Automated Teller Machine, finding an office of the financial institution (e.g., a bank branch), and the like. Other actions may include executing a query, placing a dinner reservation, and the like. The action may comprise calling one or more services or utilizing one or more APIs. For example, by interfacing with the network-based service (e.g., network-based service 125).

At operation 516, a handover condition is determined. As previously described, the handover condition may relate to a failure to recognize an intent, failure to translate the intent to an action, or the like. In addition, the handover condition may be determined, for example, through a message from the network-based service application 110 of the user computing device 105 of FIG. 1. At operation 518, in response to determining the handover condition at operation 518, the virtual assistant service may provide context information, an identifier of the user's computing device where the network-based application session is occurring, and/or authentication information. This may be provided via a system of records, as part of the security token request, or the like. At operation 520, the virtual assistant service requests a security token, e.g., from the IRS service. As noted, the request may include the context information, identifier of the user's computing device, authentication information or the like. At operation 522, the virtual assistant service may receive the security token from the IRS service. The virtual assistant service may then provide the security token to the application at operation 524.

While certain functions are described as being handled by certain components, e.g., of FIG. 1, other examples implementations may be structured so as one or more of these functions are performed in different ones of the components than the component that was described as having performed the function. In some examples, the IRS 140 may be part of the network-based service 125. Similarly, the IRS 140, the network-based service 125, the user computing device 105 may be similarly broken up into multiple components in communication with each other. In some examples, the components of FIG. 1 may communicate using one or more packet-based or circuit switched computing networks such as devices communicating over the Internet or other networks.

While the disclosure herein described instances of handover from a network-based service application to an IRS, the methods described herein are applicable to any other scenario where the customer is authenticated in one application or domain and is attempting to connect with another application or domain and the system can correlate a device identifier between each domain. For example, the user may be accessing the network-based service through a web-based interface, such as a website or webpage. The user may then transfer that authentication through a same or similar process to an IRS by use of the token transferred by the website of the network-based service through the browser of the user to the dialer.

Figure 6:
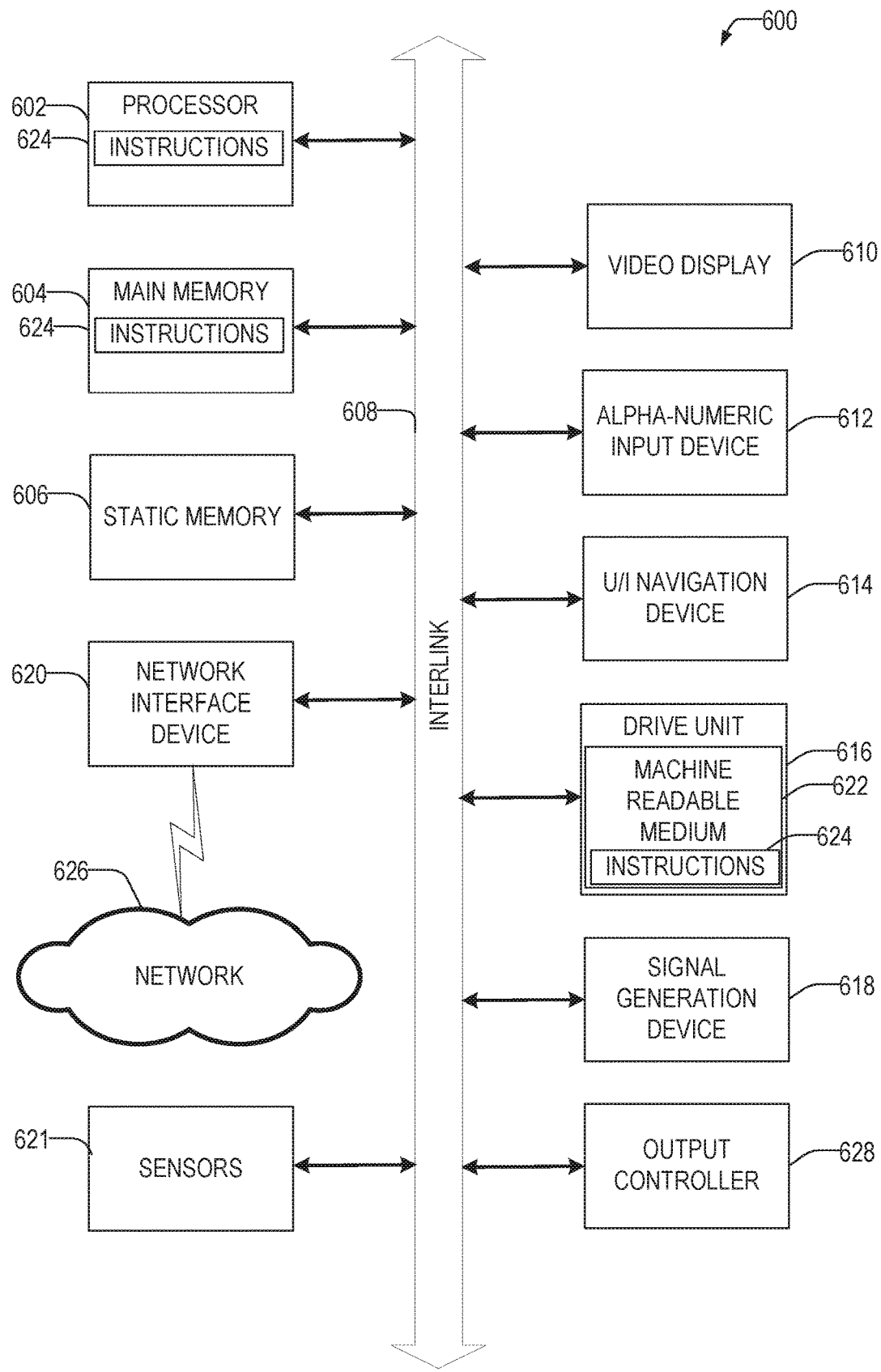
FIG. 6 is a block diagram illustrating an example of a machine upon which one or more embodiments may be implemented.

FIG. 6 illustrates a block diagram of an example machine 600 upon which any one or more of the techniques (e.g., methodologies) discussed herein may be performed. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be in the form of a personal computer (PC), a tablet PC, a set-top box (STB), a personal digital assistant (PDA, a mobile telephone, a smart phone, a web appliance, a network router, switch or bridge, or any machine capable of executing instructions (sequential or otherwise) that specify actions to be taken by that machine. Machine 600 may be configured, through hardware and/or software, to be an example of a user computing device 105, network-based service 125, IRS 140, system of records 192, and/or a network-based service 190. Machine 600 may be configured, through hardware and/or software to provide one or more GUIs, such as those shown in FIG. 2, and/or perform the methods of FIGS. 3-5. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on one or more logic units, components, or mechanisms (hereinafter "components"). Components are tangible entities (e.g., hardware) capable of performing specified operations and may be configured or arranged in a certain manner. In an example, circuits may be arranged (e.g., internally or with respect to external entities such as other circuits) in a specified manner as a component. In an example, the whole or part of one or more computer systems (e.g., a standalone, client or server computer system) or one or more hardware processors may be configured by firmware or software (e.g., instructions, an application portion, or an application) as a component that operates to perform specified operations. In an example, the software may reside on a machine readable medium. In an example, the software, when executed by the underlying hardware of the component, causes the hardware to perform the specified operations of the component.

Accordingly, the term "component" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which component are temporarily configured, each of the components need not be instantiated at any one moment in time. For example, where the components comprise a general-purpose hardware processor configured using software, the general-purpose hardware processor may be configured as respective different components at different times. Software may accordingly configure a hardware processor, for example, to constitute a particular module at one instance of time and to constitute a different component at a different instance of time.

Machine (e.g., computer system) 600 may include one or more hardware processors, such as processor 602. Processor 602 may be a central processing unit (CPU), a graphics processing unit (GPU), a hardware processor core, or any combination thereof. Machine 600 may include a main memory 604 and a static memory 606, some or all of which may communicate with each other via an interlink (e.g., bus) 608. Examples of main memory 604 may include Synchronous Dynamic Random-Access Memory (SDRAM), such as Double Data Rate memory, such as DDR4 or DDR5. Interlink 608 may be one or more different types of interlinks such that one or more components may be connected using a first type of interlink and one or more components may be connected using a second type of interlink. Example interlinks may include a memory bus, a peripheral component interconnect (PCI), a peripheral component interconnect express (PCIe) bus, a universal serial bus (USB), or the like.

The machine 600 may further include a display unit 610, an alphanumeric input device 612 (e.g., a keyboard), and a user interface (UI) navigation device 614 (e.g., a mouse). In an example, the display unit 610, input device 612 and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared(IR), near field communication (NFC), etc.) connection to communicate or control one or more peripheral devices (e.g., a printer, card reader, etc.).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 624 may further be transmitted or received over a communications network 626 using a transmission medium via the network interface device 620. The Machine 600 may communicate with one or more other machines wired or wirelessly utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks such as an Institute of Electrical and Electronics Engineers (IEEE) 802.11 family of standards known as Wi-Fi®, an IEEE 802.15.4 family of standards, a 5G New Radio (NR) family of standards, a Long Term Evolution (LTE) family of standards, a Universal Mobile Telecommunications System (UNITS) family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques.

Other Notes and Examples

Example 1 is a method of authenticating a user to a live agent and transferring context information of a session from a network-based service application of a network-based service to the live agent, the method comprising: at a first computing device of an interaction routing system (IRS): receiving a request for a first security token during the session of the network-based service application, and responsive to the request, identifying: the context information of the session of the network-based service application, an identifier of a second computing device where the session of the network-based service application occurred, and authentication information describing an authentication status of the user of the second computing device with the network-based service separate from the IRS; generating the first security token; determining an interaction routing target based upon the context information; receiving a call from a caller on a calling device, and after the call is connected, receiving a second security token; determining that an identifier of the calling device matches the identifier of the second computing device where the session of the network-based service application occurred and that the first and second security tokens match; responsive to determining that an identifier of the calling device matches the identifier of the second computing device where the session of the network-based service application occurred and that the first and second security tokens match, transferring the call to the interaction routing target; and providing, to the interaction routing target, the authentication information and the context information.

In Example 2, the subject matter of Example 1 includes, receiving a second request for a third security token, and responsive to the second request, identifying: second context information of a second user determined during a second session of a second instance of the network-based service application, a second identifier of a third computing device where the second session occurred, and second authentication information describing a second authentication status of a second user of the third computing device with the network-based service; generating the third security token; determining a second interaction routing target; receiving a second call from a second caller on a second calling device; after the second call is connected, receiving a fourth security token; determining that an identifier of the second calling device does not match the second identifier of the third computing device where the second session occurred but the third security token does match the fourth security token; in response: transferring the call to the second interaction routing target; stripping the authentication information from an interaction record; and providing, to a second target agent the second context information and an indication that the second caller is to be authenticated.

In Example 3, the subject matter of Example 2 includes, wherein the second calling device comprises a calling device of a relay operator.

In Example 4, the subject matter of Examples 1-3 includes, wherein the request for the first security token is responsive to an automated natural-language personal assistant reaching a handoff condition.

In Example 5, the subject matter of Examples 1-4 includes, wherein the request for the first security token is responsive to: an explicit request for a live agent or an inability of an automated natural-language personal assistant to determine an intent of the user.

In Example 6, the subject matter of Examples 1-5 includes, wherein the context information comprises a determined intent of the user determined by an automated natural-language personal assistant.

In Example 7, the subject matter of Examples 1-6 includes, wherein the context information comprises a transcript of the session.

Example 8 is a computing device for providing an interaction routing system (IRS) and for authenticating a user to a live agent and transferring context information of a session from a network-based service application of a network-based service to the live agent, the computing device comprising: a processor; a memory, storing instructions, which when executed, cause the processor to perform operations comprising: receiving a request for a first security token during the session of the network-based service application, and responsive to the request, identifying: the context information of the session of the network-based service application, an identifier of a second computing device where the session of the network-based service application occurred, and authentication information describing an authentication status of the user of the second computing device with the network-based service separate from the IRS; generating the first security token; determining an interaction routing target based upon the context information; receiving a call from a caller on a calling device, and after the call is connected, receiving a second security token; determining that an identifier of the calling device matches the identifier of the second computing device where the session of the network-based service application occurred and that the first and second security tokens match; responsive to determining that an identifier of the calling device matches the identifier of the second computing device where the session of the network-based service application occurred and that the first and second security tokens match, transferring the call to the interaction routing target; and providing, to the interaction routing target, the authentication information and the context information.

In Example 9, the subject matter of Example 8 includes, wherein the operations further comprise: receiving a second request for a third security token, and responsive to the second request, identifying: second context information of a second user determined during a second session of a second instance of the network-based service application, a second identifier of a third computing device where the second session occurred, and second authentication information describing a second authentication status of a second user of the third computing device with the network-based service; generating the third security token; determining a second interaction routing target; receiving a second call from a second caller on a second calling device; after the second call is connected, receiving a fourth security token; determining that an identifier of the second calling device does not match the second identifier of the third computing device where the second session occurred but the third security token does match the fourth security token; in response: transferring the call to the second interaction routing target; stripping the authentication information from an interaction record; and providing, to a second target agent the second context information and an indication that the second caller is to be authenticated.

In Example 10, the subject matter of Example 9 includes, wherein the second calling device comprises a calling device of a relay operator.

In Example 11, the subject matter of Examples 8-10 includes, wherein the request for the first security token is responsive to an automated natural-language personal assistant reaching a handoff condition.

In Example 12, the subject matter of Examples 8-11 includes, wherein the request for the first security token is responsive to: an explicit request for a live agent or an inability of an automated natural-language personal assistant to determine an intent of the user.

In Example 13, the subject matter of Examples 8-12 includes, wherein the context information comprises a determined intent of the user determined by an automated natural-language personal assistant.

In Example 14, the subject matter of Examples 8-13 includes, wherein the context information comprises a transcript of the session.

Example 15 is a non-transitory, machine-readable medium, storing instructions for providing an interaction routing system (IRS) and for authenticating a user to a live agent and transferring context information of a session from a network-based service application of a network-based service to the live agent, the instructions, when executed by a machine, cause the machine to perform operations comprising: receiving a request for a first security token during the session of the network-based service application, and responsive to the request, identifying: the context information of the session of the network-based service application, an identifier of a second computing device where the session of the network-based service application occurred, and authentication information describing an authentication status of the user of the second computing device with the network-based service separate from the IRS; generating the first security token; determining an interaction routing target based upon the context information; receiving a call from a caller on a calling device, and after the call is connected, receiving a second security token; determining that an identifier of the calling device matches the identifier of the second computing device where the session of the network-based service application occurred and that the first and second security tokens match; responsive to determining that an identifier of the calling device matches the identifier of the second computing device where the session of the network-based service application occurred and that the first and second security tokens match, transferring the call to the interaction routing target; and providing, to the interaction routing target, the authentication information and the context information.

In Example 16, the subject matter of Example 15 includes, wherein the operations further comprise: receiving a second request for a third security token, and responsive to the second request, identifying: second context information of a second user determined during a second session of a second instance of the network-based service application, a second identifier of a third computing device where the second session occurred, and second authentication information describing a second authentication status of a second user of the third computing device with the network-based service; generating the third security token; determining a second interaction routing target; receiving a second call from a second caller on a second calling device; after the second call is connected, receiving a fourth security token; determining that an identifier of the second calling device does not match the second identifier of the third computing device where the second session occurred but the third security token does match the fourth security token; in response: transferring the call to the second interaction routing target; stripping the authentication information from an interaction record; and providing, to a second target agent the second context information and an indication that the second caller is to be authenticated.

In Example 17, the subject matter of Example 16 includes, wherein the second calling device comprises a calling device of a relay operator.

In Example 18, the subject matter of Examples 15-17 includes, wherein the request for the first security token is responsive to an automated natural-language personal assistant reaching a handoff condition.

In Example 19, the subject matter of Examples 15-18 includes, wherein the request for the first security token is responsive to: an explicit request for a live agent or an inability of an automated natural-language personal assistant to determine an intent of the user.

In Example 20, the subject matter of Examples 15-19 includes, wherein the context information comprises a determined intent of the user determined by an automated natural-language personal assistant.

In Example 21, the subject matter of Examples 15-20 includes, wherein the context information comprises a transcript of the session.

Example 22 is at least one machine-readable medium including instructions that, when executed by processing circuitry, cause the processing circuitry to perform operations to implement of any of Examples 1-21.

Example 23 is an apparatus comprising means to implement of any of Examples 1-21.

Example 24 is a system to implement of any of Examples 1-21.

Example 25 is a method to implement of any of Examples 1-21.

What is claimed is:

1. A method of authenticating a user to a live agent and transferring context information of a session from a network-based service application of a network-based service to the live agent, the method comprising:
   at a first computing device of an interaction routing system (IRS):
   receiving a request for a first security token during the session of the network-based service application, and responsive to the request, identifying: the context information of the session of the network-based service application, an identifier of a second computing device where the session of the network-based service application occurred, and authentication information describing an authentication status of the user of the second computing device with the network-based service separate from the IRS;
   generating the first security token;
   determining an interaction routing target based upon the context information;
   receiving a call from a caller on a calling device, and after the call is connected, receiving a second security token;
   determining that an identifier of the calling device matches the identifier of the second computing device where the session of the network-based service application occurred and that the first and second security tokens match;
   responsive to determining that an identifier of the calling device matches the identifier of the second computing device where the session of the network-based service application occurred and that the first and second security tokens match, transferring the call to the interaction routing target;
   providing, to the interaction routing target, the authentication information and the context information;
   receiving a second request for a third security token, and responsive to the second request, identifying: second context information of a second user determined during a second session of a second instance of the network-based service application, a second identifier of a third computing device where the second session occurred, and second authentication information describing a second authentication status of a second user of the third computing device with the network-based service;
   generating the third security token;
   determining a second interaction routing target;
   receiving a second call from a second caller on a second calling device;

after the second call is connected, receiving a fourth
    security token;
determining that an identifier of the second calling device
    does not match the second identifier of the third com-
    puting device where the second session occurred but
    the third security token does match the fourth security
    token;
in response:
transferring the call to the second interaction routing
    target;
stripping the authentication information from an interac-
    tion record; and
providing, to a second target agent the second context
    information and an indication that the second caller is
    to be authenticated.

2. The method of claim 1, wherein the second calling device comprises a calling device of a relay operator.

3. The method of claim 1, wherein the request for the first security token is responsive to an automated natural-language personal assistant reaching a handoff condition.

4. The method of claim 1, wherein the request for the first security token is responsive to: an explicit request for a live agent or an inability of an automated natural-language personal assistant to determine an intent of the user.

5. The method of claim 1, wherein the context information comprises a determined intent of the user determined by an automated natural-language personal assistant.

6. The method of claim 1, wherein the context information comprises a transcript of the session.

7. A computing device for providing an interaction routing system (IRS) and for authenticating a user to a live agent and transferring context information of a session from a network-based service application of a network-based service to the live agent, the computing device comprising:
    a processor;
    a memory, storing instructions, which when executed,
        cause the processor to perform operations comprising:
    receiving a request for a first security token during the
        session of the network-based service application, and
        responsive to the request, identifying: the context infor-
        mation of the session of the network-based service
        application, an identifier of a second computing device
        where the session of the network-based service appli-
        cation occurred, and authentication information
        describing an authentication status of the user of the
        second computing device with the network-based ser-
        vice separate from the IRS;
    generating the first security token;
    determining an interaction routing target based upon the
        context information;
    receiving a call from a caller on a calling device, and after
        the call is connected, receiving a second security token;
    determining that an identifier of the calling device
        matches the identifier of the second computing device
        where the session of the network-based service appli-
        cation occurred and that the first and second security
        tokens match;
    responsive to determining that an identifier of the calling
        device matches the identifier of the second computing
        device where the session of the network-based service
        application occurred and that the first and second
        security tokens match, transferring the call to the inter-
        action routing target;
    providing, to the interaction routing target, the authenti-
        cation information and the context information;
    receiving a second request for a third security token, and
        responsive to the second request, identifying: second
context information of a second user determined during
    a second session of a second instance of the network-
    based service application, a second identifier of a third
    computing device where the second session occurred,
    and second authentication information describing a
    second authentication status of a second user of the
    third computing device with the network-based service;
generating the third security token;
determining a second interaction routing target;
receiving a second call from a second caller on a second
    calling device;
after the second call is connected, receiving a fourth
    security token;
determining that an identifier of the second calling device
    does not match the second identifier of the third com-
    puting device where the second session occurred but
    the third security token does match the fourth security
    token;
in response:
transferring the call to the second interaction routing
    target;
stripping the authentication information from an interac-
    tion record; and
providing, to a second target agent the second context
    information and an indication that the second caller is
    to be authenticated.

8. The computing device of claim 7, wherein the second calling device comprises a calling device of a relay operator.

9. The computing device of claim 7, wherein the request for the first security token is responsive to an automated natural-language personal assistant reaching a handoff condition.

10. The computing device of claim 7, wherein the request for the first security token is responsive to: an explicit request for a live agent or an inability of an automated natural-language personal assistant to determine an intent of the user.

11. The computing device of claim 7, wherein the context information comprises a determined intent of the user determined by an automated natural-language personal assistant.

12. The computing device of claim 7, wherein the context information comprises a transcript of the session.

13. A non-transitory, machine-readable medium, storing instructions for providing an interaction routing system (IRS) and for authenticating a user to a live agent and transferring context information of a session from a network-based service application of a network-based service to the live agent, the instructions, when executed by a machine, cause the machine to perform operations compris-
ing:
    receiving a request for a first security token during the
        session of the network-based service application, and
        responsive to the request, identifying: the context infor-
        mation of the session of the network-based service
        application, an identifier of a second computing device
        where the session of the network-based service appli-
        cation occurred, and authentication information
        describing an authentication status of the user of the
        second computing device with the network-based ser-
        vice separate from the IRS;
    generating the first security token;
    determining an interaction routing target based upon the
        context information;
    receiving a call from a caller on a calling device, and after
        the call is connected, receiving a second security token;
    determining that an identifier of the calling device
        matches the identifier of the second computing device where the session of the network-based service application occurred and that the first and second security tokens match;
responsive to determining that an identifier of the calling device matches the identifier of the second computing device where the session of the network-based service application occurred and that the first and second security tokens match, transferring the call to the interaction routing target;
providing, to the interaction routing target, the authentication information and the context information;
receiving a second request for a third security token, and responsive to the second request, identifying: second context information of a second user determined during a second session of a second instance of the network-based service application, a second identifier of a third computing device where the second session occurred, and second authentication information describing a second authentication status of a second user of the third computing device with the network-based service;
generating the third security token;
determining a second interaction routing target;
receiving a second call from a second caller on a second calling device;
after the second call is connected, receiving a fourth security token;
determining that an identifier of the second calling device does not match the second identifier of the third computing device where the second session occurred but the third security token does match the fourth security token;
in response:
transferring the call to the second interaction routing target;
stripping the authentication information from an interaction record; and
providing, to a second target agent the second context information and an indication that the second caller is to be authenticated.

14. The non-transitory machine-readable medium of claim 13, wherein the second calling device comprises a calling device of a relay operator.

15. The non-transitory machine-readable medium of claim 13, wherein the request for the first security token is responsive to an automated natural-language personal assistant reaching a handoff condition.

16. The non-transitory machine-readable medium of claim 13, wherein the request for the first security token is responsive to: an explicit request for a live agent or an inability of an automated natural-language personal assistant to determine an intent of the user.

17. The non-transitory machine-readable medium of claim 13, wherein the context information comprises a determined intent of the user determined by an automated natural-language personal assistant.

* * * * *